United States Patent
Böcker et al.

[11] Patent Number: 5,975,566
[45] Date of Patent: Nov. 2, 1999

[54] VEHICLE OCCUPANT RESTRAINT SYSTEM

[75] Inventors: Dietmar Böcker, Wiesbaden; Heinz Eyrainer, Waldstetten, both of Germany

[73] Assignee: TRW Occupant Restraint Systems GmbH, Alfdorf, Germany

[21] Appl. No.: 08/919,978

[22] Filed: Aug. 28, 1997

[30] Foreign Application Priority Data

Sep. 5, 1996 [DE] Germany ............. 296 15 485 U

[51] Int. Cl.[6] .................................................. B60R 21/20
[52] U.S. Cl. ................................ 280/730.2; 280/743.2
[58] Field of Search ........................... 280/730.2, 730.1, 280/733, 743.2

[56] References Cited

U.S. PATENT DOCUMENTS

| | | | |
|---|---|---|---|
| 5,333,898 | 8/1994 | Stutz | 280/730.2 |
| 5,636,862 | 6/1997 | Cheung et al. | 280/730.2 |
| 5,752,713 | 5/1998 | Matsuura et al. | 280/730.2 |

FOREIGN PATENT DOCUMENTS

| | | |
|---|---|---|
| 9211423 | 11/1992 | Germany. |
| 4337656 | 5/1995 | Germany. |
| 19519297 | 12/1995 | Germany. |
| 19547494 | 7/1997 | Germany. |
| 2278812 | 12/1994 | United Kingdom. |
| 9309977 | 5/1993 | WIPO. |
| 9626087 | 8/1996 | WIPO. |

*Primary Examiner*—Kenneth R. Rice
*Attorney, Agent, or Firm*—Tarolli, Sundheim, Covell Tummino & Szabo

[57] ABSTRACT

A vehicle occupant restraint system, particularly for vehicle occupant side restraint, includes an inflatable gas bag which, in a restraint situation, is fully inflated and is arranged in a final, desired position to restrain a vehicle occupant, a gas generator and a means engaging the gas bag. The means pulls the gas bag in a restraint situation into the desired position and maintains it in this position when the vehicle occupant impacts the gas bag.

19 Claims, 4 Drawing Sheets

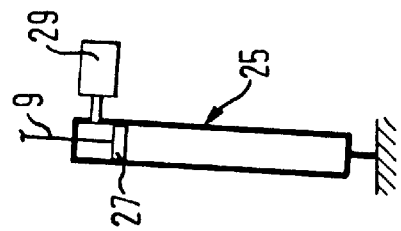
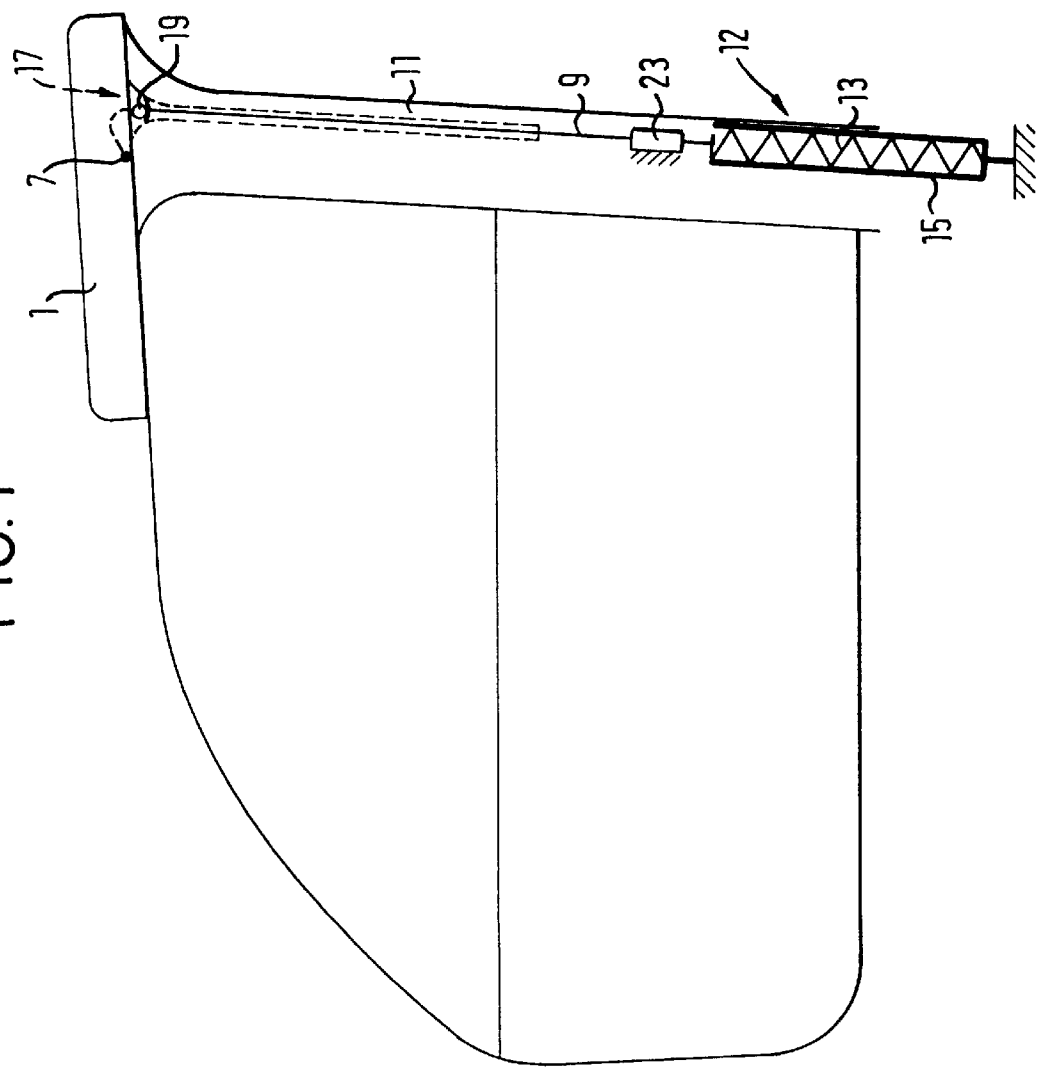

VEHICLE OCCUPANT RESTRAINT SYSTEM

FILED OF THE INVENTION

The invention relates to a vehicle occupant restraint system, particularly for vehicle occupant side restraint.

BACKGROUND OF THE INVENTION

In a restraint situation an inflated gas bag needs to absorb the forces acting on it due to impact of the vehicle occupant and to direct them into the vehicle. For this purpose, a gas bag protecting in the case of a head-on collision is supported by the steering wheel hub or the dashboard, depending on whether a driver gas bag or a front passenger gas bag is involved. A cushion-shaped head gas bag as part of a side-acting restraint system is known from DE-U 92 11 423. In this arrangement a head gas bag is disposed under the cover of the roof frame from which it emerges in a collision situation. Eye-lugs at the outer surrounding edge of the gas bag surround a cable disposed along the B-pillar. On deployment of the gas bag the cable serves to guide the gas bag, as a result of which it expands downwards guided at the sides until it has assumed a defined final position. Prior to and during impact of the occupant on the gas bag provided in the case of the restraint system according to DE-U 92 11 423, the gas bag may move along this cable guide and partly change its position, which is undesirable.

Furthermore, cushion-shaped side gas bags are known which in a restraint situation are supported by the side window of the vehicle. If, however, the window shatters in the case of a side collision, the gas bag is lacking support to a major extent so that its restraint effect is at least severely restricted.

BRIEF SUMMARY OF THE INVENTION

The invention defines a restraint system including a gas bag which in the inflated condition is positioned firmly located and does not need to be supported by the side window. The restraint system according to the invention, which is particularly for vehicle occupant side restraint, includes an inflatable gas bag which, in a restraint situation, is fully inflated and is arranged in a final, desired position to restrain a vehicle occupant, a gas generator and a means engaging the gas bag. The means pulls the gas bag in a restraint situation into the desired position and maintains it in this position when the vehicle occupant impacts the gas bag. The gas bag is not deployed solely by the compressed gas jetted into its interior and brought into its final position. Instead an active means is provided which pulls it into the desired position and also maintains it in this position so that the means also absorbs at least part of the forces acting on the gas bag on impact by the vehicle occupant. Although the restraint system in accordance with the invention is used preferably in the case of a side-impact protective means it can be put to use just as well e.g. as a knee gas bag or as a gas bag incorporated in the steering wheel or in the dashboard when the important thing is that the gas bag needs to be positioned precisely and firmly located.

In the case of the preferred embodiment the means produces a pulling force on the gas bag in its final position, and as a result of this the inflated gas bag is tensioned between mounting points at its surrounding edge in the vehicle so that despite a deformation of the vehicle it—comparable to an arrestor tape—is always tensioned securely in position in the vehicle.

The means comprises preferably a traction cable engaging the gas bag and a drive coupled thereto which is a pyrotechnical drive, a piston/cylinder drive actuatable by stored compressed gas or a spring drive.

In the case of a spring drive, employing a latching means is furthermore of advantage which by deployment of the gas bag can be shifted from a locked position into a released position in which the spring energy is liberated. This is why in the case of this embodiment no separate activating mechanisms need to be provided, since the spring drive is automatically coupled to the gas bag movement so that deployment of the gas bag triggers actuation of the spring drive. A return lock provided maintains the gas bag in the desired position and thus prevents any considerable shift in position of the gas bag e.g. due to deformation in a crash situation or due to vehicle occupant impact.

BRIEF DESCRIPTION OF THE DRAWINGS

FIG. 1 shows a vehicle occupant restraint system in accordance with the invention including an inflatable side head gas bag in non-activated condition, FIG. 1a shows a piston/cylinder linear drive actuatable pyrotechnically or by stored compressed gas which may be incorporated in the restraint system as shown in FIG. 1.

DETAILED DESCRIPTION OF PREFERRED EMBODIMENTS

Figure 4:
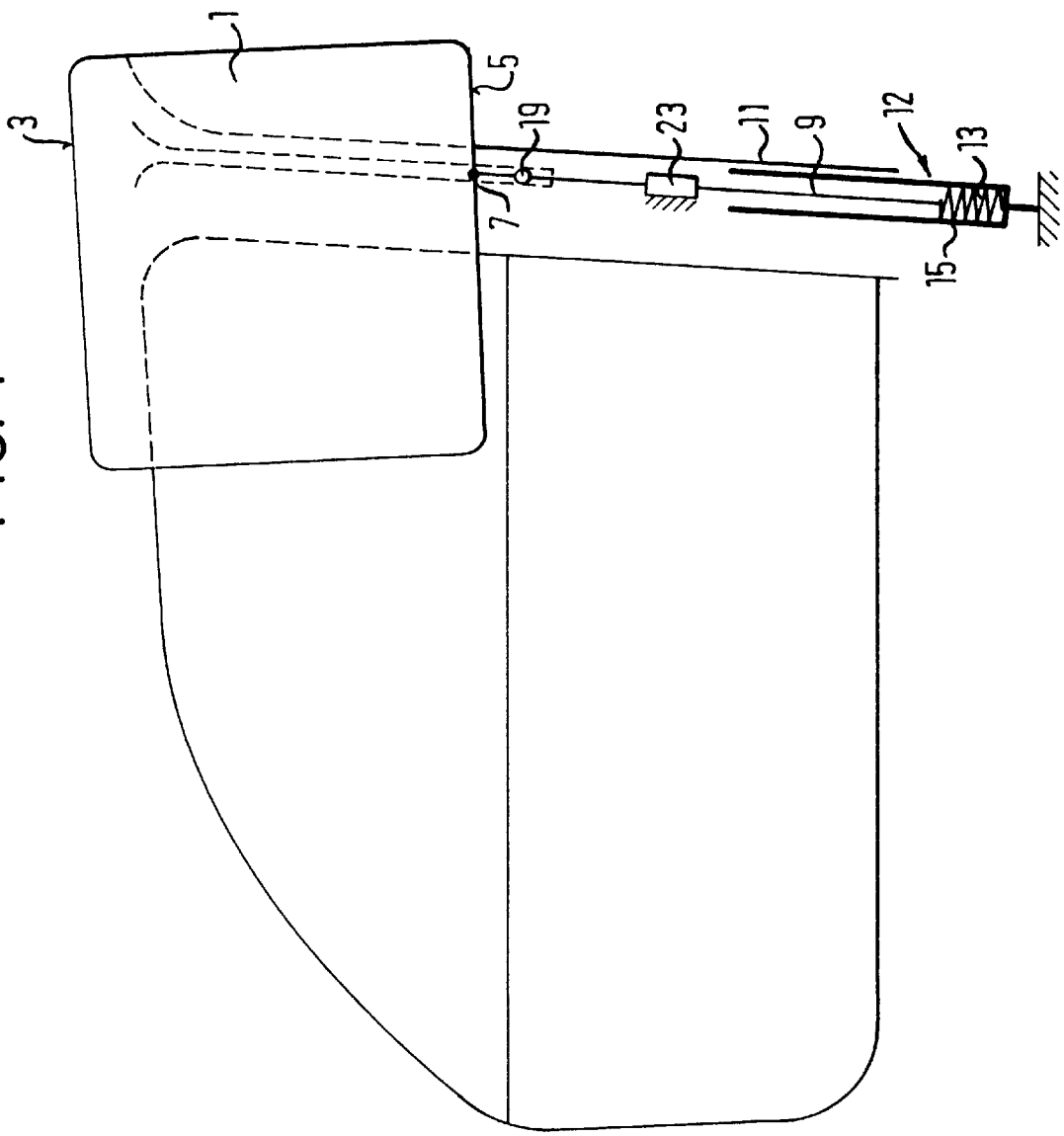
FIG. 4 is a side view of the restraint system in accordance with the invention showing the gas bag fully inflated.

FIG. 1 shows a restraint system intended to protect a vehicle occupant from head injuries in the case of vehicle side impact or toppling. The restraint system comprises a large-surface, cushion-shaped gas bag 1 incorporated underneath the cover 2 in the region of the roof frame. The gas bag 1 is, relative to its deployed state shown in FIG. 4, secured in the region of its upper surrounding edge 3 to the roof frame. At the lower surrounding edge 5 an eye-lug 7 is provided to which a traction cable 9 is secured. This cable 9 extends behind the cover 10 of the B-pillar 11 vertically in the direction to the vehicle floor where it is secured to a tension spring 13 which is tensioned in the non-actuated state of the restraint system and is accommodated in a cylinder 15. The lower end of the tension spring 13 and of the cylinder 15 is each arrested to the floor of the vehicle. To prevent the pretensioned tension spring 13 from pulling out the folded gas bag 1 from the cover 2 in the non-activated state, a latching means 17 is provided in the upper region of the B-pillar 11 which prevents downward movement of the traction cable 9. The latching means 17 consists of a locking body 19 secured to the traction cable 9 in the form of a ball which is urged against a vehicle-integral pan-like contact surface 21 to thereby prevent any movement of the traction cable 9 downwards.

A return lock 23 by way of a clamping latch through which the traction cable 9 passes permits downward movement of the traction cable 9, but not an upward return pull of the traction cable 9.

Figure 2:
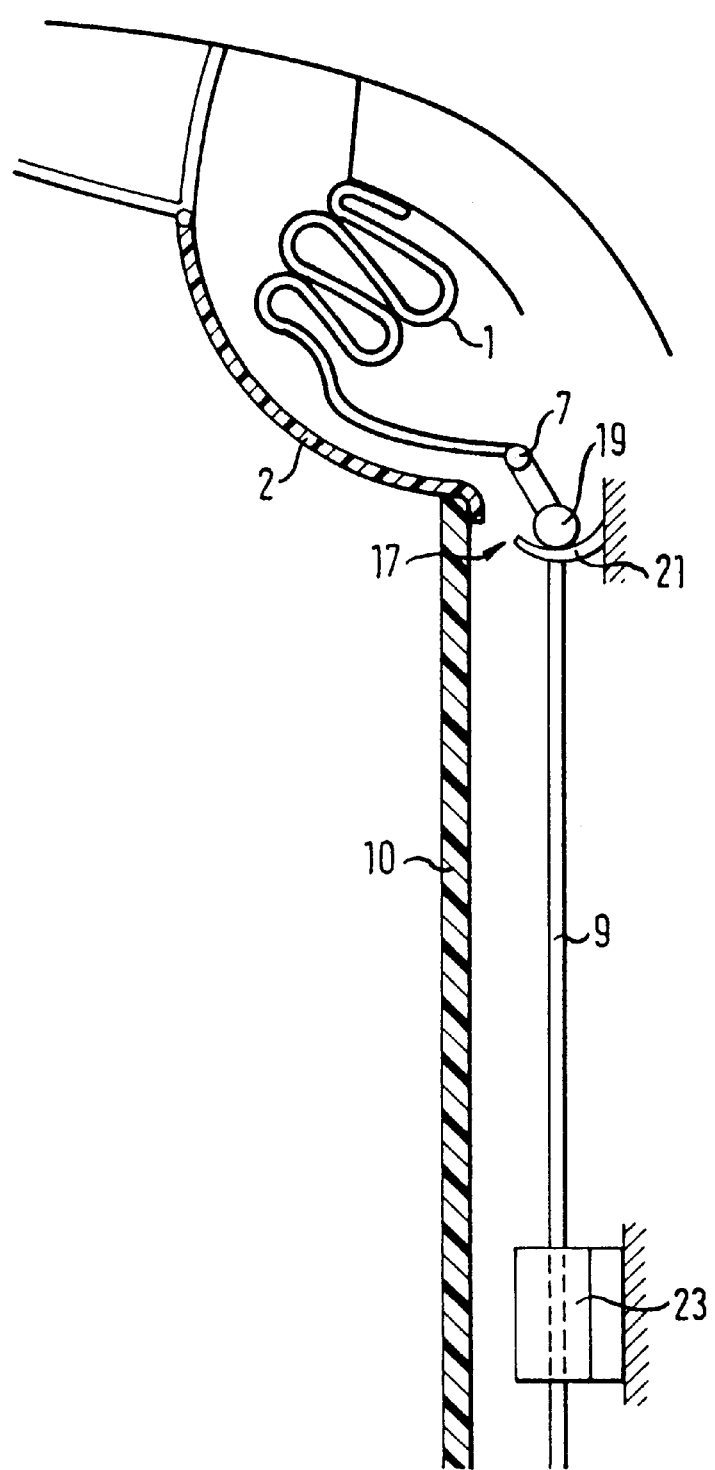
FIG. 2 is a cross-section view through the vehicle in the region of the roof frame and the upper part of the B-pillar which depicts the restraint system in accordance with the invention more clearly.
Figure 3:
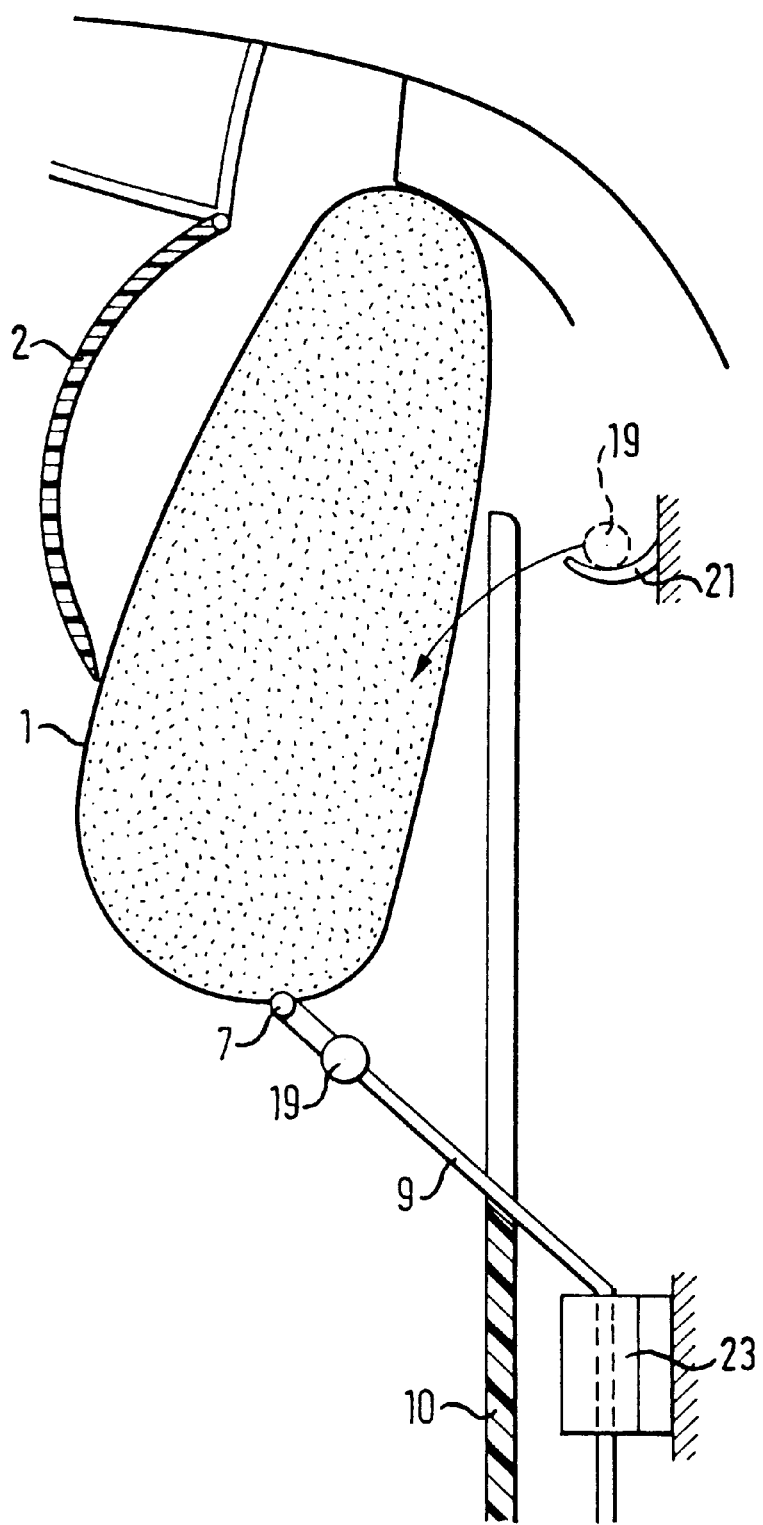
FIG. 3 is a cross-section view of the restraint system in accordance with the invention showing a partly inflated gas bag.

In a crash situation, an inflator (not shown) is ignited by an acceleration sensor which inflates the gas bag 1. The gas bag 1 bursts open the cover 2 (cf. FIG. 3) during inflation.

Due to the change in the configuration of the gas bag 1 the eye-lug 7 is also moved to the side, since it is spaced away on the side from contact surface 21. The locking body 19 is pulled from the contact surface 21 by inflation of the gas bag 1 (cf. arrow in FIG. 3) and is released so that even during the inflating action the stored spring energy is liberated and the traction cable 9 is moved downwards. The cover 10 of the B-pillar 11 is thereby burst open along a design line, as is evident from FIG. 3. The means, made up of the traction cable 9, the drive 12, the latching means 17 and the return lock 23, accelerates deployment of the gas bag 1 and guides it into its desired position in the fully inflated state, cf. FIG. 4 in which it has the shape of a cushion. In the fully inflated state too, sufficient spring energy is still present to tension the gas bag 1 between the mounting points at the upper surrounding edge 3 and at the eye-lug 7 which also constitutes a mounting point. As a result of this the gas bag 1 is located fixed in position in the vehicle and it does not need the support of the side window, which may be shattered, when the occupant impacts the gas bag 1.

The return lock 23 prevents the traction cable 9 from shifting out of place on head impact of the occupant so that a displacement of the gas bag 1 is rendered impossible. In the case of higher tensile pulling forces applied to the gas bag 1 by the drive 12 this too may also be changed in its shape.

Instead of the drive 12 a piston/cylinder linear drive 25, as shown in FIG. 1a, may also be provided, the piston 27 of which connected to the traction cable 9 is caused to move by an inflator 29, instead of which a container charged with the stored compressed gas may be used.

It will be appreciated that the means defining deployment of the gas bag 1, its position and, where necessary, its configuration is not restricted to the use in the case of a cushion-shaped head gas bag on one side of the vehicle occupant, it instead being just as applicable in the case of a knee gas bag in which the gas bag is deployed from the lower region of the dashboard, surrounding the footwell and is pulled by the means into a position directly in front of the knees of the occupant and tensioned crosswise thereto.

We claim:

1. A vehicle occupant restraint system, particularly for vehicle occupant side restraint, including:
    an inflatable gas bag which, in a restraint situation, is fully inflated and is arranged in a final, desired position to restrain a vehicle occupant;
    a gas generator;
    a means comprising a spring drive, said means engaging said gas bag and being shiftable, in a restraint situation, from a locked position into a release position, said means further pulling said gas bag into said desired position and maintaining it in this position when the vehicle occupant impacts said gas bag; and
    a latching means being shiftable, due to deployment of said gas bag, from a locked position into a release position in which spring energy of said spring drive is liberated.

2. The restraint system as set forth in claim 1, wherein said gas bag has a surrounding edge and mounting points on said edge at which it is fixed to said vehicle, said spring drive exerting a pulling force on said gas bag in said final, desired position thereof as a result of which said inflated gas bag is tensioned between said mounting points in said vehicle.

3. The restraint system as set forth in claim 2, wherein said gas bag has a configuration in its inflated state and in said final position and wherein said pulling force applied to said gas bag is so high that said means is also included in determining said configuration of said inflated gas bag.

4. The restraint system as set forth in claim 2, wherein said vehicle has at least one vehicle-integrated mounting point at which said gas bag is rigidly secured to said vehicle by securing its surrounding edge to said vehicle-integral mounting point and wherein said means engages said gas bag at a region of said surrounding edge opposing said mounting point on said surrounding edge.

5. The restraint system as set forth in claim 1, wherein said means comprises a traction cable engaging said gas bag and said spring drive.

6. The restraint system as set forth in claim 5, wherein said latching means comprises a locking body connected to said traction cable, wherein said vehicle has a vehicle-integral contact surface against which said locking body is urged in said locked position, and wherein said locking body is moved and released from said contact surface by inflation of said gas bag.

7. The restraint system as set forth in claim 1, wherein said means comprises a return lock which maintains said inflated gas bag in its final position.

8. The restraint system as set forth in claim 7, wherein said return lock is a clamp lock engaging said traction cable.

9. The restraint system as set forth in claim 1, wherein said vehicle has a roof frame and wherein said gas bag has a surrounding edge and is a cushion shaped head gas bag accommodated in said roof frame and is secured in the region of an upper portion of said surrounding edge to said vehicle and is engaged by said means at the lower portion of said surrounding edge.

10. The restraint system as set forth in claim 1, wherein said vehicle has a B-pillar with a cover and wherein said means is arranged behind said cover of said B-pillar of said vehicle.

11. A vehicle occupant restraint system, particularly for vehicle occupant side restraint, including:
    an inflatable gas bag which, in a restraint situation, is fully inflated and is arranged in a final, desired position to restraint a vehicle occupant;
    a gas generator; and
    a means comprising a drive and a traction cable engaging said gas bag and said drive, said means pulling said gas bag, in a restraint situation, into said desired position and maintaining it in this position when the vehicle occupant impacts said gas bag, said means further comprising a return lock which maintains said inflated gas bag in its final position, said return lock being a clamp lock engaging said traction cable.

12. The restraint system as set forth in claim 11, wherein said drive is one of a spring drive and a pyrotechnical drive.

13. The restraint system as set forth in claim 12, wherein a sorce for stored compressed gas is provided and wherein said drive is a piston/cylinder drive, said piston cylinder drive being coupled to said stored compressed gas and being actuatable by means of said stored compressed gas.

14. The restraint system as set forth in claim 12, including a spring drive shiftable from a locked position into a release position and including a latching means which, due to deployment of said gas bag, is shifted from a locked position into a release position in which spring energy is liberated.

15. The restraint system as set forth in claim 11, wherein said vehicle has a roof frame and wherein said gas bag has a surrounding edge and is a cushion-shaped head gas bag accommodated in said roof frame and is secured in the region of an upper portion of said surrounding edge to said vehicle and is engaged by said means at a lower portion of said surrounding edge.

16. The restraint system as set forth in claim 11, wherein said vehicle has a B-pillar with a cover and wherein said means is arranged behind said cover of said B-pillar of said vehicle.

17. The restraint system as set forth in claim 11, wherein said gas bag has a surrounding edge and mounting points on said edge at which it is fixed to said vehicle, said drive exerting a pulling force on said gas bag in said final, desired position thereof as a result of which said inflated gas bag is tensioned between said mounting points in said vehicle.

18. The restraint system as set forth in claim 17, wherein said gas bag has a configuration in its inflated state and in said final position and wherein said pulling force applied to said gas bag is so high that said means is also included in determining said configuration of said inflated gas bag.

19. The restraint system as set forth in claim 17, wherein said vehicle has at least one vehicle-integrated mounting point at which said gas bag is rigidly secured to said vehicle by securing its surrounding edge to said vehicle-integral mounting point and wherein said means engages said gas bag at a region of said surrounding edge opposing said mounting point on said surrounding edge.

\* \* \* \* \*